(12) United States Patent
Feng et al.

(10) Patent No.: US 9,602,516 B2
(45) Date of Patent: Mar. 21, 2017

(54) METHOD, SERVER AND TERMINAL DEVICE FOR ESTABLISHING COMMUNICATION SESSION

(71) Applicant: Xiaomi Inc., Beijing (CN)

(72) Inventors: Zhiyong Feng, Beijing (CN); Hui Li, Beijing (CN); Xin Shi, Beijing (CN); Chaofeng Deng, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 150 days.

(21) Appl. No.: 14/586,889

(22) Filed: Dec. 30, 2014

(65) Prior Publication Data

US 2015/0113591 A1    Apr. 23, 2015

Related U.S. Application Data

(63) Continuation-in-part of application No. PCT/CN2013/084116, filed on Sep. 24, 2013.

(30) Foreign Application Priority Data

Sep. 25, 2012   (CN) .......................... 2012 1 0362545

(51) Int. Cl.
*H04L 29/06* (2006.01)
*H04L 29/08* (2006.01)
(Continued)

(52) U.S. Cl.
CPC ........ *H04L 63/104* (2013.01); *H04L 12/1818* (2013.01); *H04L 51/04* (2013.01); *H04L 63/0421* (2013.01); *H04L 67/141* (2013.01)

(58) Field of Classification Search
None
See application file for complete search history.

(56) References Cited

U.S. PATENT DOCUMENTS 6,665,389 B1 * 12/2003 Haste, III ............... G06Q 10/10
                                                       370/259
2003/0004782 A1 * 1/2003 Kronby .................. G06Q 30/02
                                                       705/319

(Continued)

FOREIGN PATENT DOCUMENTS

CN        101645933 A     2/2010
CN        101309514 B     7/2012

(Continued)

OTHER PUBLICATIONS

"Extended European search report for 13840739.0-1853".

(Continued)

*Primary Examiner* — Michael R Vaughan
(74) *Attorney, Agent, or Firm* — Jun He Law Offices P.C.; James J. Zhu

(57) ABSTRACT

The disclosed embodiments provide a method, a server, and a terminal device for establishing a communication session. The method includes: receiving a communication session request sent from a first user via a terminal device; obtaining a communication session target for the first user, a second user, by matching for the first user; and sending an identifier of the second user to the terminal device to establish a communication session between the first user and the second user, wherein the identifier is used for the terminal device to distinguish the communication session target of the first user, and is hidden from the first user.

19 Claims, 12 Drawing Sheets

(51) Int. Cl.
*H04L 12/58* (2006.01)
*H04L 12/18* (2006.01)

(56) References Cited

U.S. PATENT DOCUMENTS

| | | | |
|---|---|---|---|
| 2003/0084103 A1* | 5/2003 | Weiner | H04L 12/1822 709/205 |
| 2005/0190898 A1* | 9/2005 | Priest | H04M 3/42008 379/88.18 |
| 2006/0282538 A1 | 12/2006 | Anglin et al. | |
| 2010/0015991 A1 | 1/2010 | Evans et al. | |
| 2010/0057857 A1* | 3/2010 | Szeto | H04L 51/04 709/206 |
| 2012/0236103 A1* | 9/2012 | Cahill | G06Q 10/101 348/14.01 |
| 2013/0117276 A1* | 5/2013 | Hedditch | H04L 67/306 707/747 |
| 2013/0194280 A1* | 8/2013 | Kwon | G06T 15/00 345/473 |

FOREIGN PATENT DOCUMENTS

| | | |
|---|---|---|
| CN | 102904936 A | 1/2013 |
| JP | 2003077001 A | 3/2003 |
| JP | 2004240124 A | 8/2004 |
| JP | 2010034658 A | 2/2010 |
| WO | 2009071388 A1 | 6/2009 |
| WO | 2012035149 A1 | 3/2012 |
| WO | 2014048305 A1 | 4/2014 |

OTHER PUBLICATIONS

XP054975822A, "Random Stranger Chats!!" Oct. 25 2009 (Oct. 25 2009).

XP055183529A, "Omegle: Talk to strangers!" Sep. 15, 2012 (Sep. 15, 2012).

XP055183533A, "Chat with random strangers—StrangerMeetup.com." Jun. 14, 2012 (Jun. 14, 2012).

* cited by examiner

METHOD, SERVER AND TERMINAL DEVICE FOR ESTABLISHING COMMUNICATION SESSION

CROSS-REFERENCE TO RELATED APPLICATIONS

This application is a Continuation-In-Part Application of International Application No. PCT/CN2013/084116, filed on Sep. 24, 2013, which is based upon and claims priority to Chinese Patent Application No. CN201210362545.8, filed on Sep. 25, 2012, the entire contents of which are incorporated herein by reference.

TECHNICAL FIELD

The present disclosure generally relates to the field of communication, and more particularly, to a method, a server, and a terminal device for establishing a communication session.

BACKGROUND

With the popularization of the Internet, a variety of communication tools have become popular. Due to the convenience of IM (Instant Messenger), which can be used in computers, mobile phones and other terminal devices, an IM account has become an essential account for everyone to obtain.

Under existing conditions, the communication tools may provide users with convenient services for communication sessions which may include text sessions, voice sessions, or video sessions and the like. Generally, requirement for establishing the communication sessions is that firstly the users need to create personal accounts on the Internet and input their own personal information such as age, gender, etc., and share that information on the Internet; secondly, two people may choose to exchange their account numbers or add accounts thereof each other to establish a friendship, that is, the two people provide authority to each other to establish a communication session and a server may establish the communication session and provide the communication session services to the users who have the friendship status.

With the rapid development of the Internet, people's social networks and the Internet are trending towards commingling of the two. Some conventional communication tools may also provide functions of randomly matching two users who do not know each other and establishing a temporary communication session, which is established through the server and does not require the two users to be in the friendship status.

However, when establishing the temporary communication session between the users, personal information of the users, such as Avatar, gender, etc., may be exposed to the other party at the same time the temporary communication session establishes, thereby rendering the users' personal information exposed under unauthorized circumstances, further leading to poor security over the users' personal information.

SUMMARY

In an aspect, the present disclosure provides a method for establishing a communication session in a server, including: receiving a communication session request sent from a first user via a terminal device; obtaining a communication session target for the first user, a second user, by matching for the first user; and sending an identifier of the second user to the terminal device to establish a communication session between the first user and the second user, wherein the identifier is used for the terminal device to distinguish the communication session target of the first user, and is hidden from the first user.

In another aspect, the present disclosure provides a method for establishing a communication session in a terminal device, including: sending a communication session request of a first user to a server; receiving an identifier of a second user sent from the server; and establishing a communication session between the first user and the second user according to the identifier of the second user, wherein the second user is a communication session target obtained by the server though matching for the first user, and the identifier is used to distinguish the communication session target of the first user and is hidden from the first user.

In still another aspect, the present disclosure provides a terminal device for establishing a communication session, comprising: a processor; and a memory for storing instructions executable by the processor, wherein the processor is configured to perform: sending a communication session request of a first user to a server; receiving an identifier of a second user sent from the server; and establishing a communication session between the first user and the second user according to the identifier of the second user, wherein the second user is a communication session target obtained by the server though matching for the first user, and the identifier is used to distinguish the communication session target of the first user and is hidden from the first user.

It is to be understood that both the foregoing general description and the following detailed description are exemplary only and are not restrictive of the present disclosure.

BRIEF DESCRIPTION OF THE DRAWINGS

In order clearly explain technical solutions of the embodiments of the present disclosure, hereinafter, an introduction to the drawings required to be used in the depiction of the prior art or the embodiments will be given below. It is apparent that the following drawings only illustrate some of the embodiments of the present disclosure, and a person skilled in the art could obtain other drawings based on these drawings.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art with reference to particular embodiments.

DETAILED DESCRIPTION

Detailed embodiments of a method, a server, a terminal device and an apparatus for establishing a communication session provided by the embodiments of the present disclosure are described in detail hereinafter with reference to the accompanying drawings.

Figure 1:
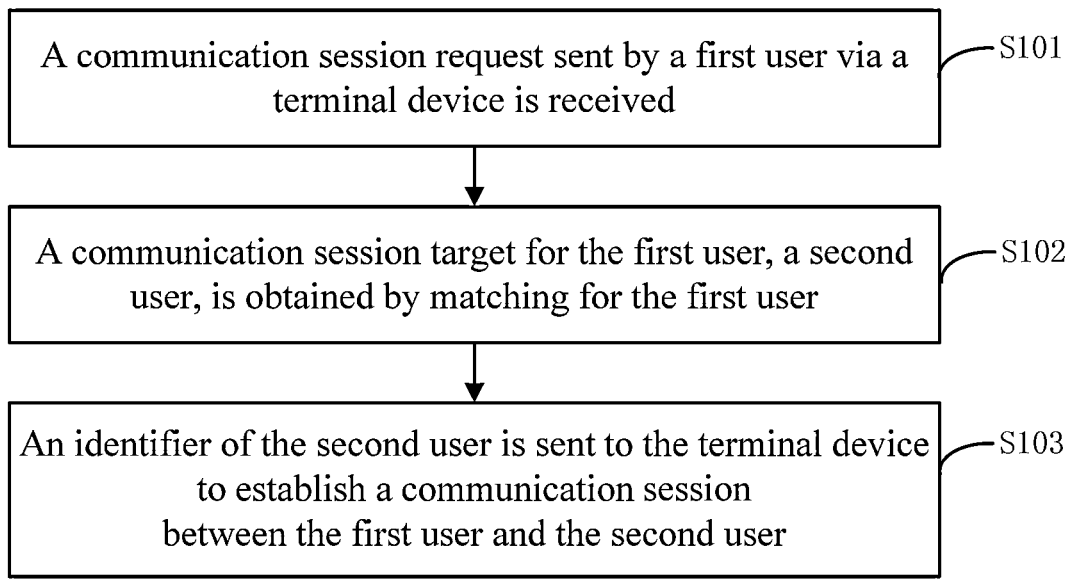
FIG. 1 is an exemplary flow chart showing a method for establishing a communication session provided by an embodiment of the present disclosure.

As shown in FIG. 1, an embodiment of the present disclosure provides a method for establishing a communication session in a server, where the method improves the server for establishing the communication session. The method includes the following steps.

In step S101, a communication session request, which is sent from a first user via a terminal device, is received.

In step S102, a communication session target for the first user, a second user, is obtained by matching for the first user.

In step S103, an identifier of the second user is sent to the terminal device to establish a communication session between the first user and the second user.

The identifier is used for the terminal device to distinguish the communication session target of the first user.

In an exemplary embodiment, the identifier can be invisible to the first user, that is, the terminal device hides the identifier of the second user from the first user.

Furthermore, after the server successfully matches the first user and the second user and a temporary communication session may be carried out, the server sends the identifier of the second user to the terminal device in order to facilitate the terminal device to establish the communication session between the first user and the second user. During the establishment of the communication session, the identifier is only used for the terminal device to distinguish which communication session target the communication session comes from without outputting the identifier of the second user, so as to achieve the effect of hiding the identifier of the second user.

Alternatively, after performing step S103, the method may further include a step of sending a communication session message, which carries the identifier of the second user and communication session content of the second user, to the terminal device.

Alternatively, after performing step S103, the method may further include a step of receiving communication session content, which is input by the first user in the communication session between the first user and the second user and the identifier of the second user sent from the terminal device, and sending a communication session message, which carries an identifier of the first user, the identifier of the second user and the communication session content of the first user, to the second user.

Alternatively, after performing step S103, the method may further include: sending user information of the second user to the terminal device; or, processing the user information of the second user, such that the processed user information of the second user does not reveal personal information of the second user, and sending the processed user information of the second user to the terminal device.

The communication session request sent from the first user via the terminal device is received in a manner where the communication session request sent from the first user via a terminal device is received, and a receiving timing of the communication session request of the first user is recorded as a first timing.

Moreover, in an exemplary embodiment, the step of obtaining the communication session target by matching for the first user may be performed in the following manner: determining whether a real-time communication session target matching to the first user exists according to the first timing; establishing the real-time communication session target matching to the first user as the second user, if the real-time communication session target matching to the first user exists; and establishing a user who sends a communication session request at a time closest to and prior to the first timing as the second user, if the real-time communication session target matching to the first user does not exist. In this case, the real-time communication session target matching to the first user is a user who sends a communication session request within a first period prior to or after the first timing.

Furthermore, in an exemplary embodiment, a process for determining whether the real-time communication session target matching to the first user exists may be performed in the following manner.

In step A, it is determined whether the communication session target matching to the first user is recorded in a locally stored register table, if the communication session target matching to the first user is recorded in the locally stored register table, the process proceeds to step B; if the communication session target matching to the first user is not recorded in the locally stored register table, the process proceeds to step C.

In step B, the communication session target matching to the first user recorded in the locally stored register table is used as the real-time communication session target matching to the first user, and the process ends.

In step C, the communication session target matching to the first user is selected from a local candidate queue according to a first preset rule, the process proceeds to step D if the selection is successful; and the process proceeds to step E if the selection is failed.

In step D, the communication session target, which is matched to the first user and selected from the local candidate queue according to the first rule, is used as the real-time communication session target matching to the first user, and the first user and the real-time communication session target matching to the first user are recorded in the register table, and the process ends.

In step E, the first user is added to the candidate queue, and the process returns to the step A, and it is determined that the real-time communication session target matching to first user does not exist if the real-time communication session target matching to the first user is not successfully matched when a duration of time for the process reaches the first period, and the process ends.

The first rule may be any one or any combination of the following rules: a rule in which a user who has different gender from the first user is selected from the candidate queue with a first preset probability to be used as the real-time communication session target matching to the first user; and a rule in which a user who is in the same city as the first user is selected from the candidate queue with a second preset probability to be used as the real-time communication session target matching to the first user.

Furthermore, in an exemplary embodiment, the step of establishing the user who sends the communication session request at the time closest to and prior to the first timing as the second user may be performed in the following manner: searching for a user who sends the communication session request prior to the first timing in a forwarding order in accordance with the timing at which the communication session request is sent; using the user who meets the second present rule as the second user if the user who meets the second preset rule is found.

The second rule may be any one or any combination of the following rules: a rule in which a user who has different gender from the first user is selected from the candidate queue with a third preset probability to be used as the second user; and a rule in which a user who is in the same city as the first user is selected from the candidate queue with a fourth preset probability to be used as the second user.

Alternatively, after step S103, the method may further include steps of receiving a request sent from the first user for obtaining the user information of the second user when the communication session between the first user and the second user reaches a first preset condition; and sending the request of the first user for obtaining the user information to the second user.

Alternatively, after step S103, the method may further include a step of sending the user information of the second user to the terminal device.

The first condition may be met when the number of conversations reaches a preset number in the communication session between the first user and the second user.

Alternatively, after step S103, the method may further include a step of sending opening remarks of the second user to the terminal device. The opening remarks of the second user may comprise words, photos, audio files or video files locally stored by the second user.

The embodiment of the present disclosure provides the method for establishing the communication session, in which after the first user sends the communication session request, the communication session target is matched to the first user, and the identifier of the communication session target (i.e., the second user) of the first user is returned back to the terminal device so as to establish the communication session, such that the terminal device may distinguish conversations through the identifier, and thus personal information of the users will not be outputted without the users' permission. Therefore, the temporary communication session for the users is accomplished without revealing the personal information of the users, and the security measures of the personal information of the users are enhanced.

Figure 2:
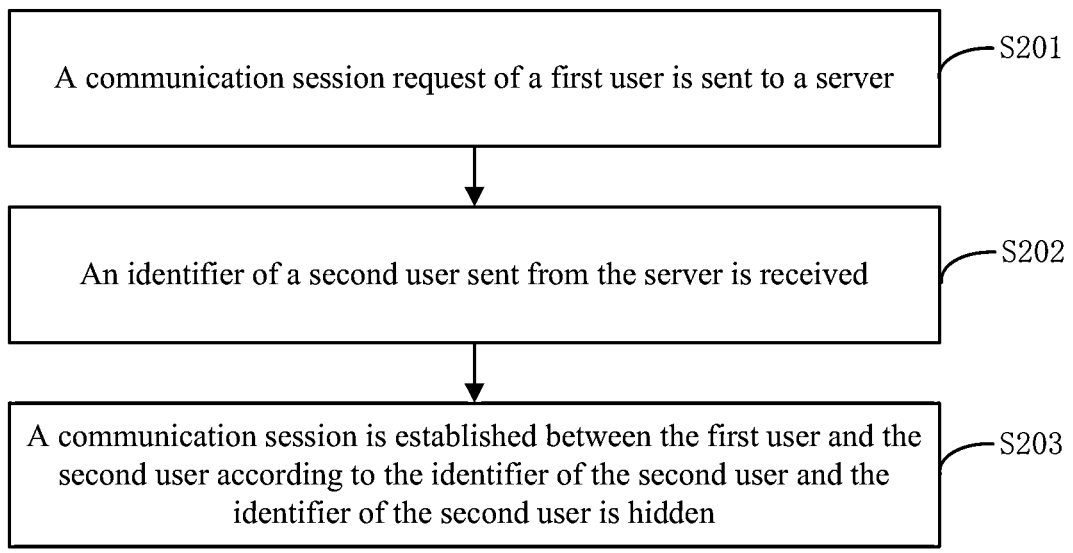
FIG. 2 is an exemplary flow chart showing another method for establishing a communication session provided by an embodiment of the present disclosure.

As shown in FIG. 2, an embodiment of the present disclosure provides a method for establishing a communication session in a terminal device, where the method improves the terminal device for establishing a communication session. The method includes the following steps.

In step S201, a communication session request of a first user is sent to a server.

In step S202, an identifier of a second user sent from the server is received.

In step S203, a communication session is established between the first user and the second user according to the identifier of the second user and the identifier of the second user is hidden.

The second user is a communication session target, which is obtained by the server through matching for the first user, and the identifier is used to distinguish the communication session target of the first user.

Alternatively, after step S203, the method further includes steps of receiving a communication session message which is sent from the server and carries the identifier of the second user and communication session content of the second user; and outputting the communication session content of the second user in the communication session between the first user and the second user.

Alternatively after step S203, the method further includes steps of receiving communication session content inputted by the first user in the communication session between the first user and the second user, and sending the communication session content of the first user and the identifier of the second user to the server.

Alternatively, after step S203, the method further includes steps of receiving user information of the second user sent from the server, and processing and outputting the user information of the second user, such that the outputted user information of the second user does not reveal personal information of the second user.

Alternatively, after step S203, the method further includes steps of receiving user information of the first user; and processing the user information of the first user, such that the processed user information of the first user does not reveal personal information of the first user.

Alternatively, after step S203, the method further includes a step of forwarding a request sent from the first user for obtaining the use information of the second user to the server if the communication session between the first user and the second user reaches a first preset condition.

Alternatively, if the second user agrees to the request of the first user for obtaining the user information, the method further includes a step of receiving the user information of the second user sent from the server.

The first condition may be met when the number of conversations reaches a preset number in the communication session between the first user and the second user.

Alternatively, after step S203, the method further includes a step of outputting opening remarks of the second user sent from the server. The opening remarks of the second user may comprise words, photos, audio files or video files stored in the server by the second user.

The embodiment of the present disclosure provides the method for establishing a communication session in a server, in which after the first user sends the communication session request, the communication session target is matched to the first user, and the identifier of the communication session target (i.e., the second user) of the first user is returned back to the terminal device so as to establish the communication session, such that the terminal device may distinguish conversations through the identifier, and thus personal information of the users cannot be outputted without the users' permission. The temporary communication session for the users is accomplished without revealing the personal information of the users, and the security measures of the personal information of the users are enhanced.

Figure 3:
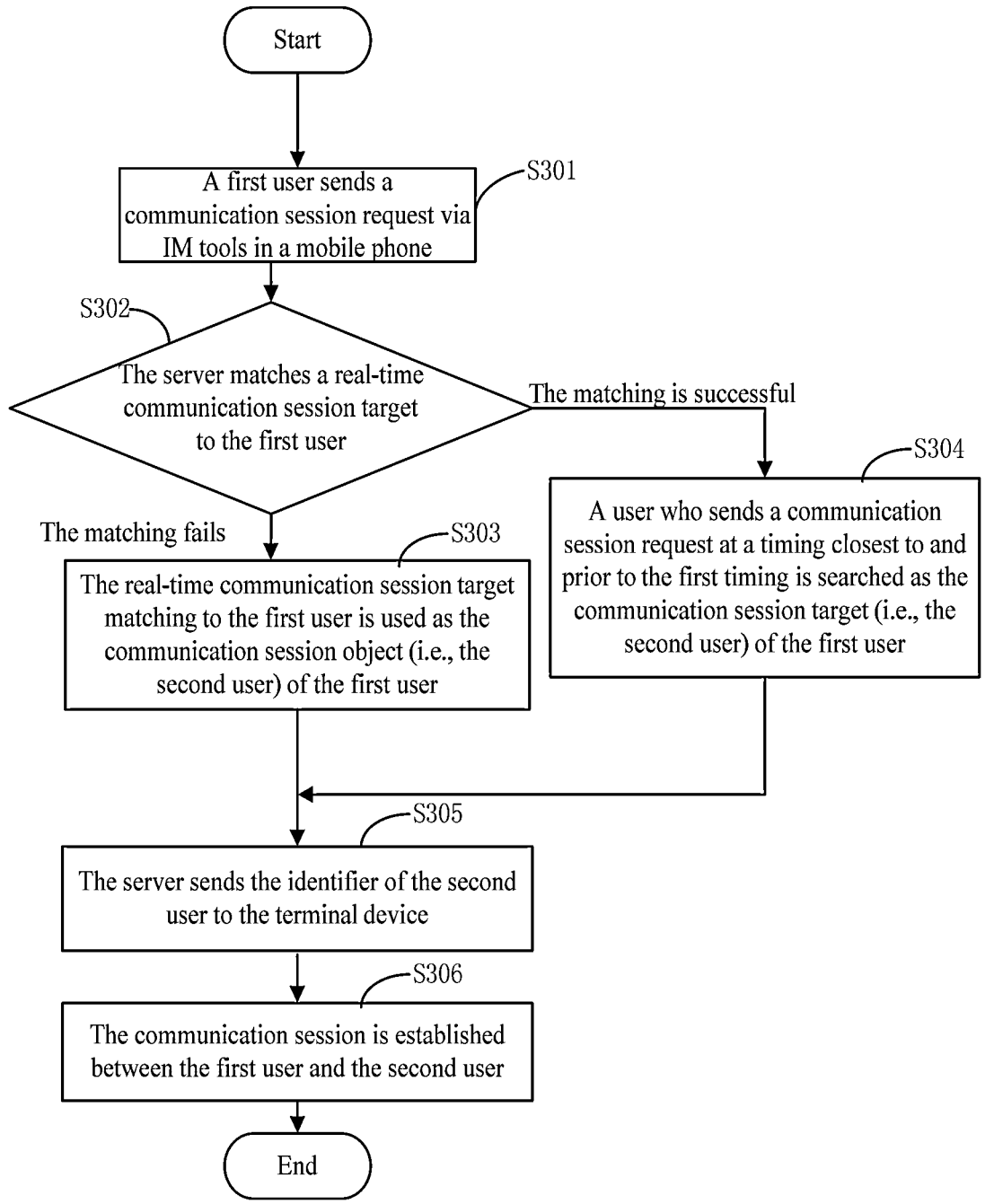
FIG. 3 is an exemplary flow chart showing another method for establishing a communication session provided by an embodiment of the present disclosure.

As shown in FIG. 3, an embodiment of the present disclosure provides a method for establishing a communication session. The method includes the following steps.

In step S301, a first user sends a communication session request via IM tools in a mobile phone.

In the present embodiment, the mobile phone is described as an example of a terminal device for convenience, the first user installs the IM tools in the mobile phone, and the first user successfully logs in with an IM account on the mobile phone. The communication session request in the present embodiment refers to a request for establishing a conversation with a non-friend user, i.e., for requiring a server to match a conversation target (communication session target) to the first user.

It should be noted that when the embodiment of the present disclosure is implemented, in addition to the mobile phone, the terminal device may also be a tablet PC, a notebook computer, a PC, etc., which is not limited to the mobile phone.

For example, a time axis is set in the server for recording a time at which a user sends a communication session request to the server. Correspondingly, when receiving the communication session request sent from the first user, the server records the current time as a first timing.

In step S302, the server matches a real-time communication session target to the first user, if the matching is successful, the process proceeds to step S303; and if the matching fails, the process proceeds to step S304.

In the present embodiment, the real-time communication session target may be defined as that other users who send a communication session request within a first period prior to or after the first timing, and a center point of the first period is the first timing.

In the related art, if a communication session target is matched to a user, only random matching can be performed. In the embodiment of the present disclosure, by using the manner of matching the real-time communication session target to the first user, user experience may be improved, so as to achieve real-time capability of matching and establishing the communication session, in such a manner that the user feels that the communication session target, that is matched after the user sends the communication session request, is also a user who needs to establish the communication session.

Figure 4:
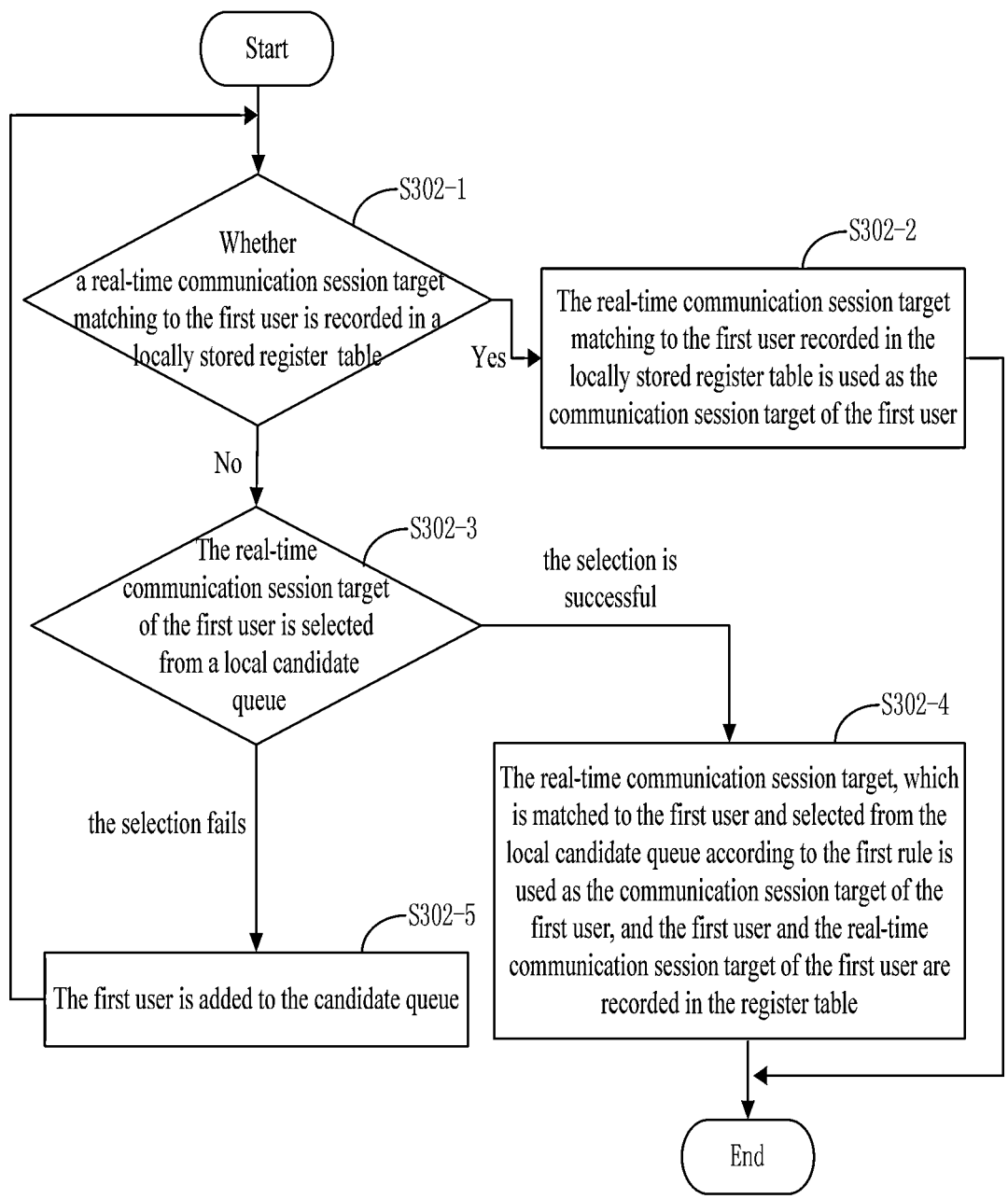
FIG. 4 is an exemplary flow chart showing a process for matching a real-time communication session target to a first user by a server in a method for establishing a communication session provided by an embodiment of the present disclosure.

Furthermore, in an exemplary embodiment, as shown in FIG. 4, the server may be performed in the following manner for matching the real-time communication session target to the first user.

In step S302-1, it is determined whether a real-time communication session target matching to the first user is recorded in a locally stored register table; if the real-time communication session target matching to the first user is recorded in the locally stored register table, the process proceeds to step S302-2; and if the real-time communication session target matching to the first user is not recorded in the locally stored register table, the process proceeds to step S302-3.

For example, a register table is created locally in the server, communication session targets of respective users are recorded in real-time in the register table, and when the server needs to match a real-time communication session target to the user, the communication session target may be searched in the register table.

In step S302-2, the real-time communication session target matching to the first user recorded in the locally stored register table is used as the communication session target of the first user, and the process ends.

In step S302-3, the real-time communication session target of the first user is selected from a local candidate queue according to a first preset rule; if the selection is successful, the process proceeds to step S302-4; and if the selection fails, the process proceeds to step S302-5.

For example, a candidate queue is also locally stored in the server for matching a real-time communication session target to the user to whom the real-time communication session target is not matched in the step S302-1.

Furthermore, in an exemplary embodiment, the first rule may be any one or any combination of the following rules: rule 1 in which a user who has different gender from the first user is selected from the candidate queue with a first preset probability to be used as the real-time communication session target of the first user; rule 2 in which a user who is in the same city as the first user is selected from the candidate queue with a second preset probability to be used as the real-time communication session target matching to the first user.

User information of each user is stored in the server, and the user information includes geographic location information and gender of each user. The first rule is only an optional manner, and the first rule may define the matching for the communication session target, which is based on information such as the user's hobbies, school.

In the present embodiment, the method is described by taking both of the first probability and the second probability being 100% as an example. The selecting the real-time communication session target of the first user from the local candidate queue according to the first preset rule may be as follows: randomly selecting a user, who has different gender from the first user but in the same city as the first user, from the local candidate queue as the real-time communication session target of the first user.

In step S302-4, the real-time communication session target, which is matched to the first user and selected from the local candidate queue according to the first rule, is used as the communication session target of the first user, and the first user and the real-time communication session target of the first user are recorded in the register table, and the process ends.

In step S302-5, the first user is added to the candidate queue, and the process returns to the step S302-1, if the real-time communication session target matching to the first user is not successfully matched when reaching first duration, it is determined that the real-time communication session target matching to the first user does not exist, and the process ends.

Alternatively, if the real-time communication session target is not matched to the first user when first duration is exceeded, it is determined that the real-time communication session target of the first user does not exist.

In an exemplary embodiment, when the first user sends the communication session request, the mobile phone of the first user displays a searching animation and duration of the searching animation is longer than or equal to the first period, such that the server matches the real-time communication session target to the first user within the first period.

The first period may be set by a developer or the user, for example, in the present embodiment, the first period may be set as 5 seconds.

Moreover, after the first user is added to the candidate queue for the first preset period, the first user is deleted from the candidate queue.

In step S303, the real-time communication session target matching to the first user is used as the communication session target (i.e., the second user) of the first user, and the process proceeds to step S305.

In step S304, a user who sends a communication session request at a time closest to and prior to the first timing is searched as the communication session target (i.e., the second user) of the first user, and the process proceeds to step S305.

Furthermore, in an exemplary embodiment, step S304 may be performed in the following manner: the first timing on the time axis created in the server is taken as a starting point, the user who sends the communication session request to the server is searched for in a forwarding order; if a user who meets a second preset rule is found, the user who meets the second present rule is used as the communication session target of the first user.

For example, the second rule may be any one or any combination of the following rules: rule 3, in which a user who has different gender from the first user, is selected with a third preset probability to be used as the communication session target of the first user; rule 4, in which a user who is in the same city as the first user, is selected with a fourth preset probability to be used as the real-time communication session target matching to the first user.

User information of each user is stored in the server, and the user information includes geographic location information and gender of each user. The second rule is only an optional manner, and the second rule may define the matching for the communication session target, which is based on information such as the user's hobbies, school and likes.

In the present embodiment, the method is described by taking both of the third probability and the fourth probability being 70% as an example. The step, in which the first timing on the time axis created in the server is taken as the starting point, the user who sends the communication session request to the server is searched for in a forwarding order, when a user who meets a second preset rule is found, the user who meets the second present rule is used as the communication session target of the first user, may be as follows.

Gender and city of the communication session target of the first user is determined according to the third probability and the fourth probability.

The first timing on the time axis created in the server is taken as the starting point, the user who sends the communication session request to the server is searched for in a forwarding order, if a user who meets the gender and the city of the communication session target of the first user determined according to the third probability and fourth probability is found, then the user who meets the gender and the city of the communication session target of the first user determined according to the third probability and the fourth probability is used as the communication session target of the first user.

The method is described by taking an example that the third probability is 70% and the first user is male, the determining the gender of the communication session target of the first user according to the third probability may be performed in the following manner:

A token bucket is created, 70% of tokens is marked as female and 30% of the tokens is marked as male, a token is randomly assigned to the first user, and the gender marked on the token is used as the gender of the communication session target of the first user.

Similarly, the method is described by taking an example that the fourth probability is 70% and the first user is in Beijing, then determining the city of the communication session target of the first user according to the fourth probability may be performed in the following manner.

A token bucket is created, 70% of tokens is marked as Beijing and 30% thereof is marked as non-Beijing, a token randomly assigned to the first user, and the city marked on the token is used as the city of the communication session target of the first user.

In step S305, the server sends the identifier of the second user to the terminal device.

The identifier is used for the terminal device to distinguish the communication session target of the first user, and the identifier is hidden from the first user.

Furthermore, in an exemplary embodiment, after the first user sends the communication session request to the server via the terminal device, then the terminal device establishes a temporary communication session between the first user and the second user, and hides the identifier of the second user, that is, the terminal device does not output the identifier of the second user, but optionally only outputs the communication session content of the first user and the second user, such that the first user cannot obtain the identifier of the second user, thus the first user cannot obtain the personal information of the second user without the second user's permission.

For example, the identifier is hidden from the first user, after the terminal device receives the identifier of the second user, the terminal device establishes the communication session between the first user and the second user, and alternatively the communication session may be outputted in a form of a communication session group in the IM tools, so as to facilitate the communication session between the first user and the second user.

The identifier may be the IM account of the user, but it is invisible to the communication session target of the user. The identifier may also be a secondary account registered under the IM account by the user, the secondary account is only used for an instant communication session between the users, and the user cannot obtain the user information of each other through the secondary account.

For example, when the first user operates several groups of conversations at present, it may be determined which group the communication session belongs to according to the identifier of the second user; or when the first user receives communication session content sent from the server, it may be determined which user sends the communication session content according to the identifier sent along with the communication session content.

In step S306, the communication session is established between the first user and the second user, and the process ends.

Alternatively, after the communication session between the first user and the second user is established, only respective conversation information is displayed in the communication session to ensure that user privacy is not revealed.

Figure 5:
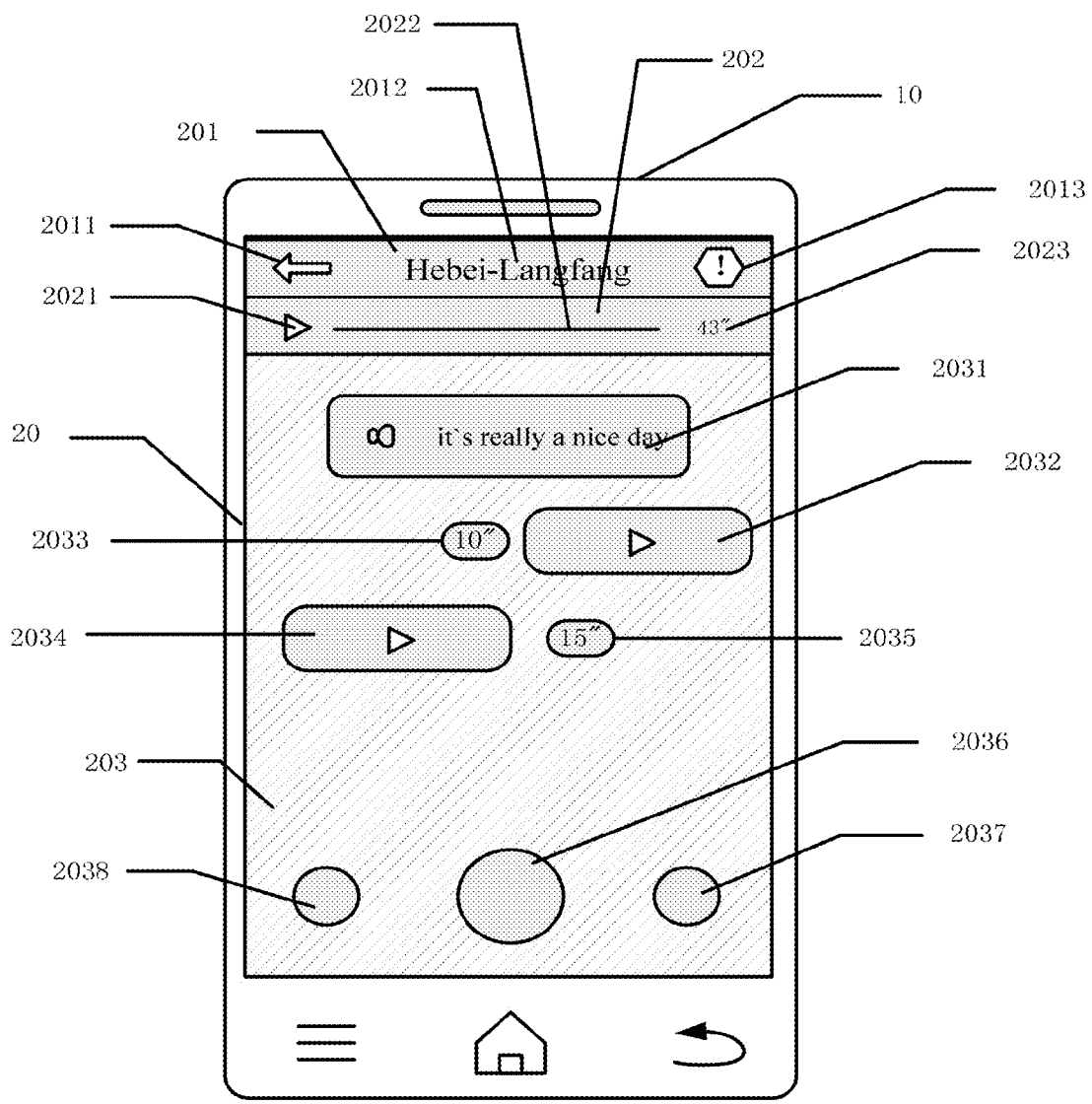
FIG. 5 is a diagram illustrating a completely established communication session interface provided by an embodiment of the present disclosure.

In the present embodiment, for example, the communication session content of the users may be transferred in the form of the audio files. FIG. 5 is a diagram illustrating an interface after the communication session between the first user and the second user is established.

FIG. 5 illustrates an interface on a display area 20 of a mobile phone 10.

A notification bar 201 of the communication session contains a function button for returning the previous interface 2011, a function button for display the city of the communication session target 2012, and a function button for setting a parameter 2013.

The opening remarks 202 of the communication session target contains a play button for playing the opening remarks of the communication session target 2021, a play progress bar 2022, and duration of the opening remarks of the communication session target 2023.

Within a chat frame 203, a random tip generated by the server 2031, the communication session content (audio files) 2032 sent from the first user and provided with a play button, duration of the communication session content 2033 sent from the first user, the communication session content 2034 (audio files) sent from the second user and provided with a play button, duration of the communication session content 2035 sent from the second user, a function button for recording an audio file 2036 to be sent as communication session content, a function button for displaying a chat status 2037, and a function button for changing a communication session target 2038 are displayed.

As shown in FIG. 5, after the communication session between the first user and the second user is established, the first user and the second user may send the communication session content to each other. In the present embodiment, the communication session content are only described to be the audio files, but in actual implementation, the communication session content may also be any content that is transmittable through the network such as words, photos or video files.

processed user information of each user is displayed in the communication session between the first user and the second user, the processed user information does not reveal the user's personal information.

Alternatively, the processing of the user information of each user may be carried out by the server or the terminal device.

For example, an avatar of each user is displayed in the chat frame, and the avatar is subjected to a preset fuzzy processing, the fuzzy processing may increase frosted glass effect of the avatar of each other or edits the user's avatar, such that main face features of the user is concealed, thus the user's privacy may be effectively protected.

Alternatively, when the communication session between the first user and the second user reaches the first condition, the first user and the second user may apply for viewing the user information of each other.

The embodiment of the present disclosure provides the method for establishing the communication session in the server, in which after the first user sends the communication session request, the communication session target is matched to the first user by the server, and the identifier of the communication session target (i.e., the second user) of the first user is returned back to the terminal device so as to establish the communication session, such that the terminal device may distinguish conversations through the identifier, thus personal information of the users cannot be outputted without the users' permission. A temporary communication session for the users is accomplished without revealing the personal information of the users, and the security measures of the personal information of the users are enhanced.

Figure 6:
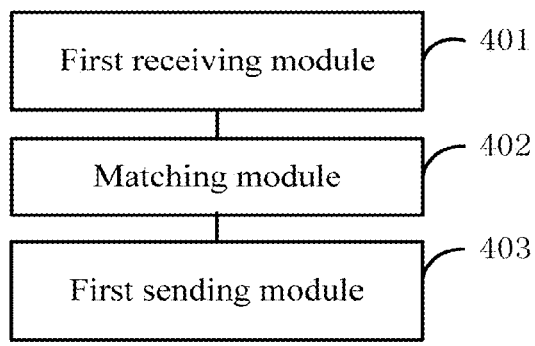
FIG. 6 is a block diagram illustrating a server for establishing a communication session provided by an embodiment of the present disclosure.

As shown in FIG. 6, the present embodiment provides a server for establishing a communication session, where the server comprises: a first receiving module 401 configured to receive a communication session request sent from a first user via a terminal device; a matching module 402 configured to match a communication session target (i.e., a second user) to the first user; and a first sending module 403 configured to send an identifier of the second user to the terminal device to establishes a communication session between the first user and the second user.

The identifier is used for the terminal device to distinguish the communication session target of the first user, and the identifier is hidden from the first user.

Figure 7:
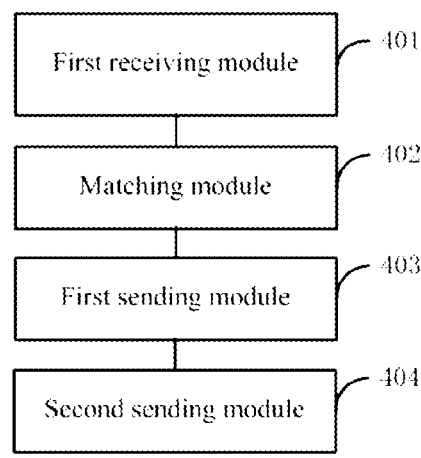
FIG. 7 is a block diagram illustrating a server for establishing a communication session provided by an embodiment of the present disclosure.

Alternatively, as shown in FIG. 7, the server may further include: a second sending module 404 configured to send a communication session message which carries the identifier of the second user and communication session content of the second user to the terminal device, after the first sending module 403 sends the identifier of the second user to the terminal device so that the terminal device establishes the communication session between the first user and the second user.

Figure 8:
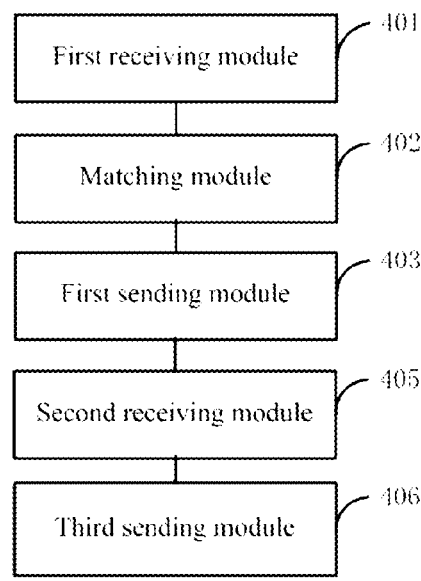
FIG. 8 is a block diagram illustrating a server for establishing a communication session provided by an embodiment of the present disclosure.

Alternatively, as shown in FIG. 8, the server may further include: a second receiving module 405 configured to receive communication session content inputted by the first user in the communication session between the first user and the second user and the identifier of the second user sent from the terminal device, after the first sending module 403 sends the identifier of the second user to the terminal device so that the terminal device establishes the communication session between the first user and the second user; and a third sending module 406 configured to send a communication session message which carries an identifier of the first user, the identifier of the second user and the communication session content of the first user to the second user.

Figure 9:
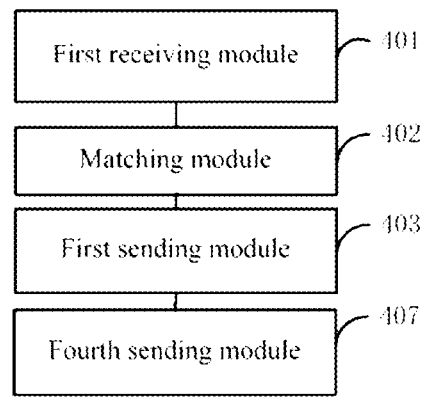
FIG. 9 is a block diagram illustrating a server for establishing a communication session provided by an embodiment of the present disclosure.
Figure 10:
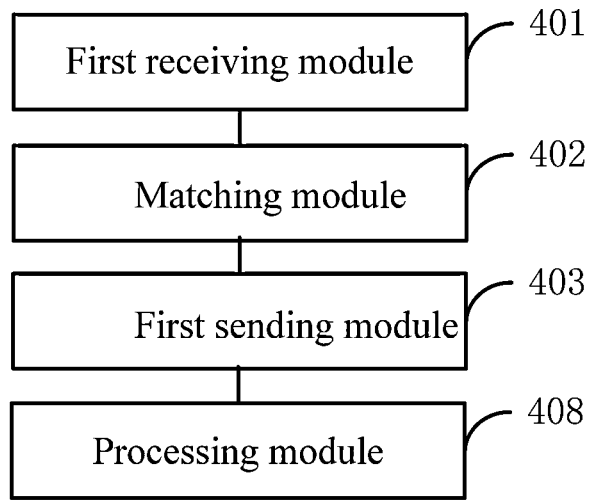
FIG. 10 is a block diagram illustrating a server for establishing a communication session provided by an embodiment of the present disclosure.

Alternatively, as shown in FIG. 9 or FIG. 10, the server may further include: a fourth sending module 407 configured to send user information of the second user to the terminal device, after the first sending module 403 sends the identifier of the second user to the terminal device so that the terminal device establishes the communication session between the first user and the second user; or, a processing module 408 configured to process the user information of the second user, after the first sending module 403 sends the identifier of the second user to the terminal device so that the terminal device establishes the communication session between the first user and the second user, such that the processed user information of the second user does not reveal personal information of the second user, and is configured to send the processed user information of the second user to the terminal device.

Figure 11:
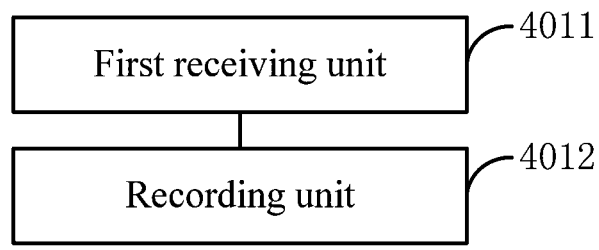
FIG. 11 is a block diagram illustrating a first receiving module in a server for establishing a communication session provided by an embodiment of the present disclosure.

Alternatively, as shown in FIG. 11, the first receiving module 401 includes: a first receiving unit 4011 configured to receive a communication session request sent from a first user via a terminal device; a recording unit 4012 configured to record a time, at which the communication session request of the first user is received, as a first timing.

Figure 12:
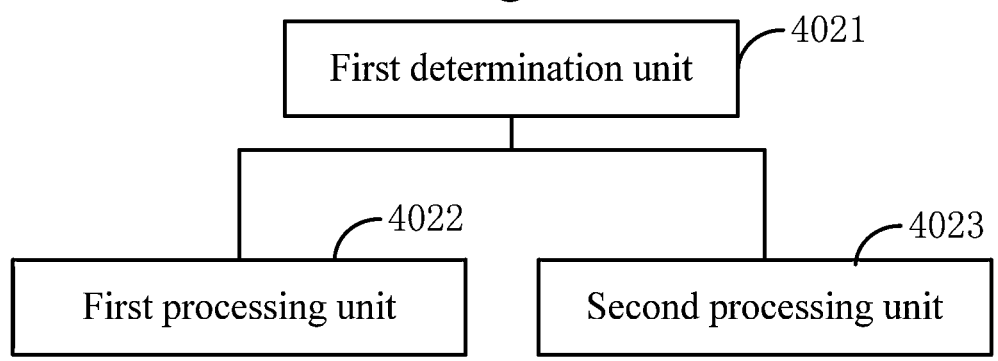
FIG. 12 is a block diagram illustrating a matching module in a server for establishing a communication session provided by an embodiment of the present disclosure.

As shown in FIG. 12, the matching module 402 includes: a first determination unit 4021 configured to determine whether a real-time communication session target matching to the first user exists according to the first timing; a first processing unit 4022 configured to use the real-time communication session target matching to the first user as the second user, if the first determination unit 4021 determines that the real-time communication session target matching to the first user exists; a second processing unit 4023 configured to search for a user, who sends a communication session request at a time closest to and prior to the first timing, as the second user, if the first determination unit 4021 determines that the real-time communication session target matching to the first user does not exists. The real-time communication session target matching to the first user is a user who sends a communication session request within a first period prior to or after the first timing.

Alternatively, the first determination unit 4021 is configured to perform operations of the following steps.

In step A, it is determined whether a communication session target matching to the first user is recorded in a locally stored register table; if the communication session target matching to the first user is recorded in the locally stored register table, the process proceeds to step B; and if the communication session target matching to the first user is not recorded in the locally stored register table, the process proceeds to step C.

In step B, the communication session target matching to the first user recorded in the locally stored register table is used as the real-time communication session target matching to the first user, and the process ends.

In step C, the communication session target matching to the first user is selected from a local candidate queue according to a first preset rule, if the selection is successful, the process proceeds to step D; and if the selection fails, the process proceeds to step E.

In step D, the communication session target, which is matched to the first user and selected from the local candidate queue according to the first rule, is used as the real-time communication session target matching to the first user, and the first user and the real-time communication session target matching to the first user is recorded in the register table, and the process ends.

In step E, the first user is added to the candidate queue, and the process returns to the step A, if the real-time communication session target matching to the first user is not successfully matched when reaching the first duration, it is determined the real-time communication session target matching to the first user does not exist, and the process ends.

Alternatively, the first rule is any one or any combination of the following rules: a rule in which a user who has different gender from the first user is selected from the candidate queue with a first preset probability to be used as the real-time communication session target matching to the first user; and a rule in which a user who is in the same city as the first user is selected from the candidate queue with a second preset probability to be used as the real-time communication session target matching to the first user.

Alternatively, the second processing unit 4023 is configured to search for a user who sends a communication session request prior to the first timing in a forwarding order in accordance with the timing at which the communication session request is sent, if a user who meets a second preset rule is found, then the user who meets the second present rule is used as the second user.

Alternatively, the second rule is any one or any combination of the following rules: a rule in which a user, who has different gender from the first user, is selected with a third preset probability to be used as the second user; and a rule in which a user, who is in the same city as the first user, is selected with a fourth preset probability to be used as the second user.

Figure 13:
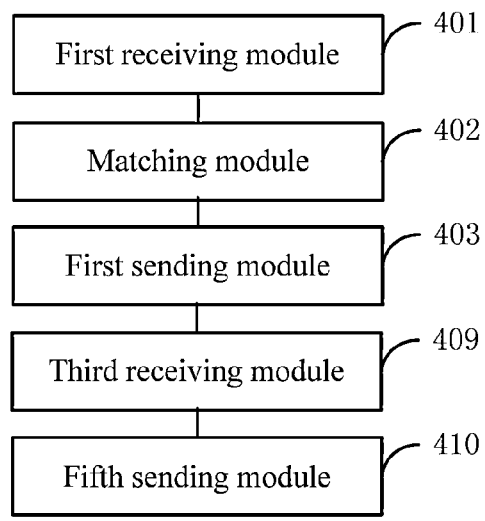
FIG. 13 is a block diagram illustrating a server for establishing a communication session provided by an embodiment of the present disclosure.

Alternatively, as shown in FIG. 13, the server may further include: a third receiving module 409 configured to receive a request sent from the first user for obtaining the user information of the second user when the communication session between the first user and the second user reaches a first preset condition, after the first sending module 403 sends the identifier of the second user to the terminal device so that the terminal device establishes the communication session between the first user and the second user; and a fifth sending module 410 configured to send the request of the first user for obtaining the user information to the second user.

Figure 14:
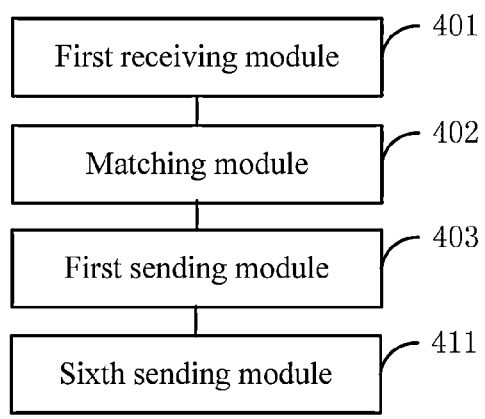
FIG. 14 is a block diagram illustrating a server for establishing a communication session provided by an embodiment of the present disclosure.

Alternatively, as shown in FIG. 14, the server may further include: a sixth sending module 411 configured to send the user information of the second user to the terminal device when the second user agrees to the request of the first user for obtaining the user information.

Alternatively, the first condition is met when the number of conversations reaches a preset number in the communication session between the first user and the second user.

Figure 15:
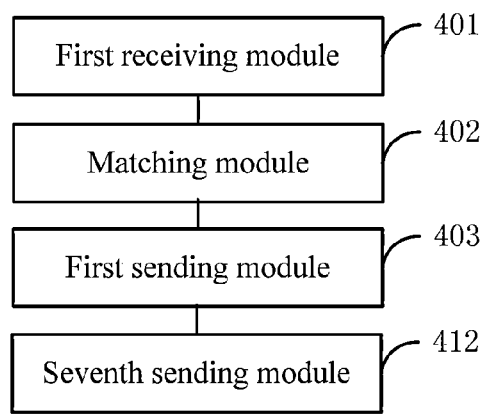
FIG. 15 is a block diagram illustrating a server for establishing a communication session provided by an embodiment of the present disclosure.

Alternatively, as shown in FIG. 15, the server may further include: a seventh sending module 412 configured to send opening remarks of the second user to the terminal device, after the first sending module 403 sends the identifier of the second user to the terminal device so that the terminal device establishes the communication session between the first user and the second user. The opening remarks of the second user may comprise words, photos, audio files or video files locally stored by the second user.

The embodiment of the present disclosure provides the server for establishing the communication session, in which after the first user sends the communication session request, the communication session target is matched to the first user, and the identifier of the communication session target, the second user, of the first user is returned back to the terminal device so as to establish a communication session, such that the terminal device may distinguish conversations through the identifier, thus no personal information of the users is outputted without the users' permission, meanwhile a temporary communication session for the users is accomplished without revealing the personal information of the users, and the security measures of the personal information of the users are enhanced.

Figure 16:
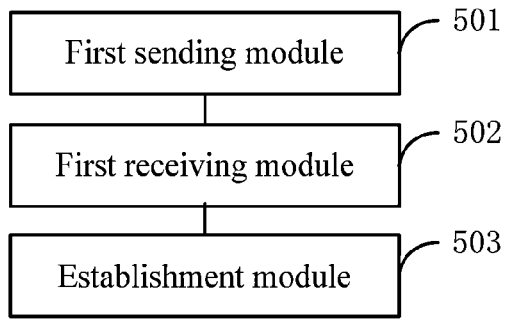
FIG. 16 is a block diagram illustrating an apparatus for establishing a communication session provided by an embodiment of the present disclosure.

As shown in FIG. 16, the present embodiment provides an apparatus in a terminal device for establishing a communication session including: a first sending module 501 configured to send a communication session request of a first user to a server; a first receiving module 502 configured to receive an identifier of a second user sent from the server; an establishment module 503 configured to establish a communication session between the first user and the second user according to the identifier of the second user and hide the identifier of the second user. The second user is a communication session target obtained by the server though matching for first user, and the identifier is used to distinguish the communication session target of the first user.

Figure 17:
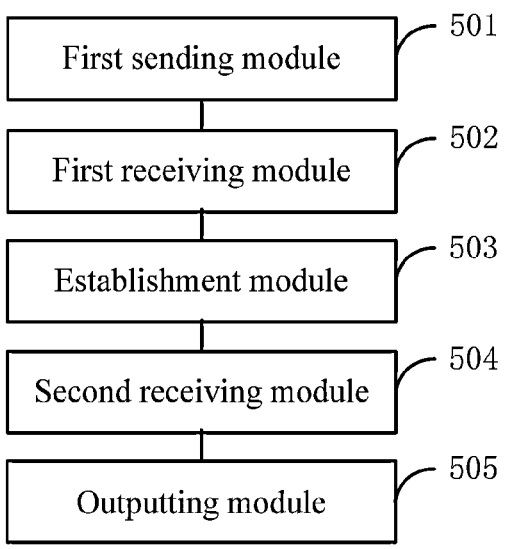
FIG. 17 is a block diagram illustrating an apparatus for establishing a communication session provided by an embodiment of the present disclosure.

Alternatively, as shown in FIG. 17, the apparatus may further include: a second receiving module 504 configured to receive a communication session message that is sent from the server and carries the identifier of the second user and communication session content of the second user, after the establishment module 503 establishes the communication session between the first user and the second user according to the identifier of the second user; and an output module 505 configured to output the communication session content of the second user in the communication session between the first user and the second user.

Figure 18:
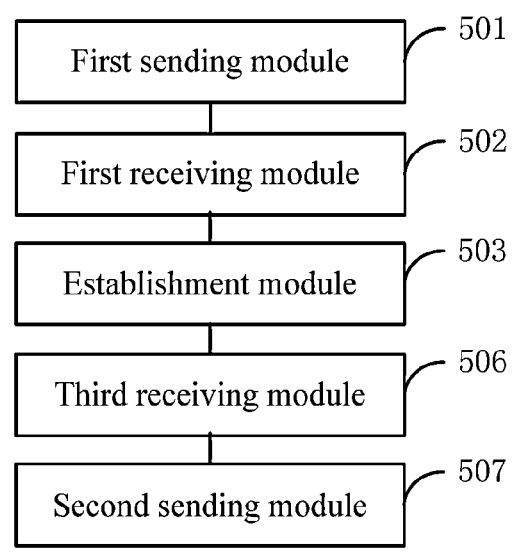
FIG. 18 is a block diagram illustrating an apparatus for establishing a communication session provided by an embodiment of the present disclosure.

Alternatively, as shown in FIG. 18, the apparatus may further include: a third receiving module 506 configured to receive communication session content inputted by the first user in the communication session between the first user and the second user, after the establishment module 503 establishes the communication session between the first user and the second user according to the identifier of the second user; and a second sending module 507 configured to send the communication session content of the first user and the identifier of the second user to the server.

Figure 19:
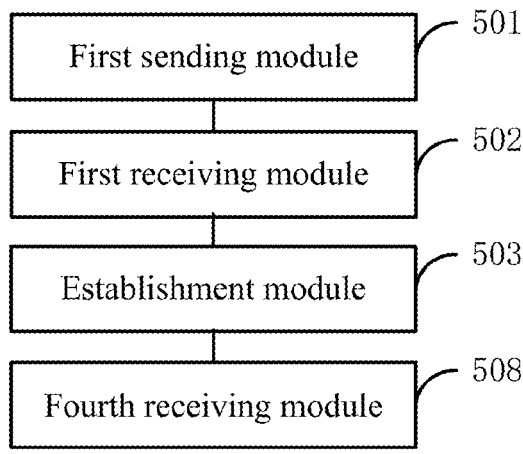
FIG. 19 is a block diagram illustrating an apparatus for establishing a communication session provided by an embodiment of the present disclosure.

Alternatively, as shown in FIG. 19, the apparatus may further include: a fourth receiving module 508 configured to receive user information of the second user sent from the server, and to process and output the user information of the second user, such that the outputted user information of the second user does not reveal personal information of the second user, after the establishment module 503 establishes the communication session between the first user and the second user according to the identifier of the second user.

Figure 20:
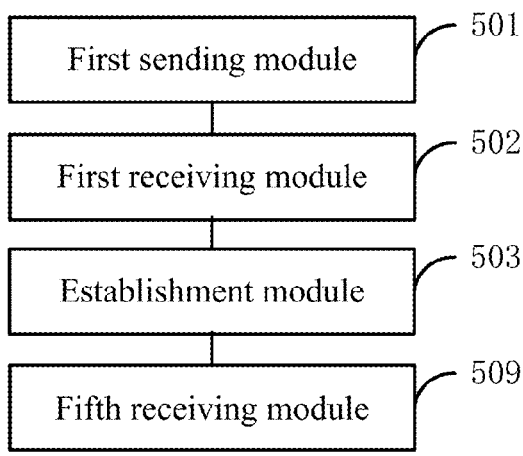
FIG. 20 is a block diagram illustrating an apparatus for establishing a communication session provided by an embodiment of the present disclosure.

Alternatively, as shown in FIG. 20, the apparatus may further include: a fifth receiving module 509 configured to receive user information of the first user, and to process the user information of the first user, such that the processed user information of the first user does not reveal personal information of the first user, after the establishment module 503 establishes the communication session between the first user and the second user according to the identifier of the second user.

Figure 21:
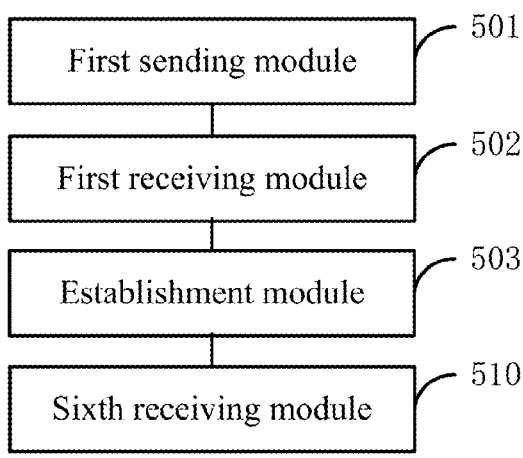
FIG. 21 is a block diagram illustrating an apparatus for establishing a communication session provided by an embodiment of the present disclosure.

Alternatively, as shown in FIG. 21, the apparatus may further include: a sixth receiving module 510 configured to receive and forward a request sent from the first user for obtaining the user information of the second user to the server when the communication session between the first user and the second user reaches a first preset condition, after the establishment module 503 establishes the communication session between the first user and the second user according to the identifier of the second user.

Figure 22:
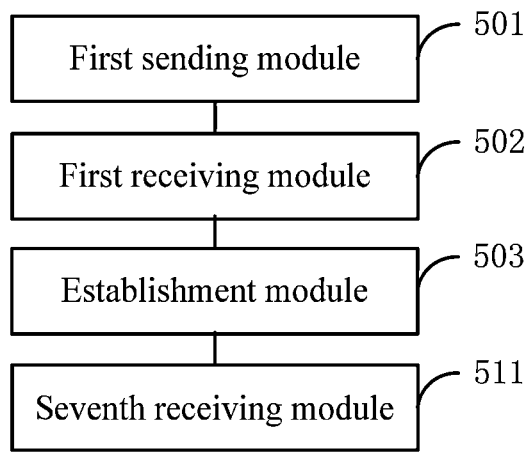
FIG. 22 is a block diagram illustrating an apparatus for establishing a communication session provided by an embodiment of the present disclosure.

Alternatively, as shown in FIG. 22, the apparatus may further include: a seventh receiving module 511 configured to receive the user information of the second user sent from the server when the second user agrees to the request of the first user for obtaining the user information.

Alternatively, the first condition is met when the number of conversations reaches a preset number in the communication session between the first user and the second user.

Figure 23:
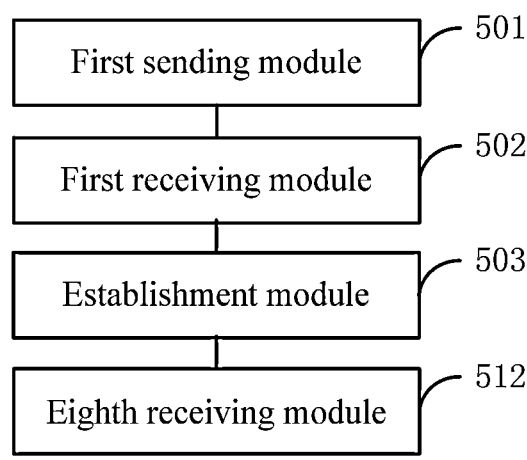
FIG. 23 is a block diagram illustrating an apparatus for establishing a communication session provided by an embodiment of the present disclosure.

As shown in FIG. 23, the apparatus may further include: an eighth receiving module 512 configured to receive and output opening remarks of the second user sent from the server, after the establishment module 503 establishes the communication session between the first user and the second user according to the identifier of the second user. The opening remarks of the second user may comprise words, photos, audio files or video files stored in the server by the second user.

The embodiment of the present disclosure provides the apparatus for establishing the communication session, in which after the first user sends the communication session request, the communication session target is matched to the first user by the server, and the identifier of the communication session target, the second user, of the first user returned back by the server is received, so as to establish a communication session, such that the terminal device may distinguish conversations through the identifier, thus no personal information of the users is outputted without the users' permission, meanwhile a temporary communication session for the users is accomplished without revealing the personal information of the users, and the security measures of the personal information of the users are enhanced.

The present embodiment further provides a system for establishing a communication session including any server for establishing a communication session as described above and any terminal device for establishing a communication session as described above.

The embodiment of the present disclosure provides a system for establishing a communication session, after a first user sends a communication session request, a communication session target is matched to the first user, and only an identifier of the communication session target (i.e., a second user) of the first user is returned back to a terminal device so as to establish a communication session, such that the terminal device distinguishes conversations through the identifier, thus no personal information of the users is outputted without the users' permission, meanwhile a temporary communication session for the users is accomplished without revealing the personal information of the users, and the security measures of the personal information of the users are enhanced.

An embodiment of the present disclosure further provides a server, which includes: one or more processors, a memory and one or more programs. The one or more programs is stored in the memory and configured to be executed by the one or more processors. The one or more programs have the following functions: receiving a communication session request sent from a first user via a terminal device; obtaining a communication session target for the first user, a second user, by matching for the first user; and sending an identifier of the second user to the terminal device to establish a communication session between the first user and the second user. The identifier is used for the terminal device to distinguish the communication session target of the first user, and the identifier is hidden from the first user.

Alternatively, the one or more programs also have the following functions: sending a communication session message which carries the identifier of the second user and communication session content of the second user to the terminal device after the identifier of the second user is sent to the terminal device to establishes the communication session between the first user and the second user.

Alternatively, the one or more programs also have the following functions: receiving communication session content inputted by the first user in the communication session between the first user and the second user and the identifier of the second user sent from the terminal device, and sending a communication session message which carries an identifier of the first user, the identifier of the second user and the communication session content of the first user to the second user, after the identifier of the second user is sent to the terminal device so that the terminal device establishes the communication session between the first user and the second user.

Alternatively, the one or more programs also have the following functions: sending user information of the second user to the terminal device, after the identifier of the second user is sent to the terminal device so that the terminal device establishes the communication session between the first user and the second user; or, processing the user information of the second user such that the processed user information of the second user does not reveal personal information of the second user, and sending the processed user information of the second user to the terminal device.

Alternatively, receiving the communication session request sent from the first user via the terminal device may be performed in the following manner: receiving the communication session request sent from the first user via the terminal device, and recording a receiving time of the communication session request of the first user as a first timing.

Alternatively, obtain the communication session target (i.e., the second user) by matching for the first user may be performed in the following manner: determining whether a real-time communication session target matching to the first user exists according to the first timing; using the real-time communication session target matching to the first user as the second user if the real-time communication session target matching to the first user exists; and searching for a user, who sends a communication session request at a time closest to and prior to the first timing, as the second user if the real-time communication session target matching to the first user does not exist. The real-time communication session target matching to the first user is a user who sends a communication session request within a first period prior to or after the first timing.

Alternatively, a process of determining whether the real-time communication session target matching to the first user exists may be performed in the following manner.

In step A, it is determined whether a communication session target matching to the first user is recorded in a locally stored register table, if the communication session target matching to the first user is recorded in the locally stored register table, the process proceeds to step B; and if the communication session target matching to the first user is not recorded in the locally stored register table, the process proceeds to step C.

In step B, the communication session target matching to the first user recorded in the locally stored register table is used as the real-time communication session target matching to the first user, and the process ends.

In step C, the communication session target matching to the first user is selected from a local candidate queue according to a first preset rule, if the selection is successful, the process proceeds to step D; and if the selection fails, the process proceeds to step E.

In step D, the communication session target, which is matched to the first user and selected from the local candidate queue according to the first rule, is used as the real-time communication session target matching to the first user, and the first user and the real-time communication session target matching to the first user is recorded in the register table, and the process ends.

In step E, the first user is added to the candidate queue, and the process returns to the step A, if the real-time communication session target matching to the first user is not successfully matched when reaching the first duration, it is determined that the real-time communication session target matching to the first user does not exist, and the process ends.

Alternatively, the first rule may be any one or any combination of the following rules: a rule in which a user, who has different gender from the first user, is selected from the candidate queue with a first preset probability to be used as the real-time communication session target matching to the first user; and a rule in which a user, who is in the same city as the first user is selected from the candidate queue, with a second preset probability to be used as the real-time communication session target matching to the first user.

Alternatively, searching for the user who sends the communication session request at the time closest to and prior to the first timing as the second user may be performed in the following manner: searching for a user who sends the communication session request prior to the first timing in a forwarding order in accordance with the timing at which the communication session request is sent, if the user who meets a second preset rule is found, the user who meets the second present rule is used as the second user.

Alternatively, the second rule may be any one or any combination of the following rules: a rule in which a user who has different gender from the first user is selected with a third preset probability to be used as the second user; and a rule in which a user who is in the same city as the first user is selected with a fourth preset probability to be used as the second user.

Alternatively, the one or more programs also have the following functions: after the identifier of the second user is sent to the terminal device so that the terminal device establishes the communication session between the first user and the second user, receiving a request sent from the first user for obtaining the user information of the second user when the communication session between the first user and the second user reaches a first preset condition; and sending the request of the first user for obtaining the user information to the second user.

Alternatively, the one or more programs also have the following functions: sending the user information of the second user to the terminal device when the second user agrees to the request of the first user for obtaining the user information.

Alternatively, the first condition may be that in the communication session between the first user and the second user, the number of conversations reaches a preset number.

Alternatively, the one or more programs also have the following functions: sending opening remarks of the second user to the terminal device after the identifier of the second user is sent to the terminal device so that the terminal device establishes the communication session between the first user and the second user. The opening remarks of the second user may comprise words, photos, audio files or video files locally stored by the second user.

In addition, the present embodiment further provides a nonvolatile readable storage medium for storing one or more programs, wherein the one or more programs are applied to a server such that the server may execute instructions of the following steps: receiving a communication session request sent from a first user via a terminal device; obtaining a communication session target for the first user, a second user, by matching for the first user; and sending an identifier of the second user to the terminal device to establish a communication session between the first user and the second user. The identifier is used for the terminal device to distinguish the communication session target of the first user, and is hidden from the first user.

An embodiment of the present disclosure further provides a terminal device, for example, the terminal device may be a mobile phone, a tablet PC, a mobile computer and so on.

The terminal device includes: one or more processors, a memory and one or more programs stored in the memory and configured to be executed by the one or more processors. The one or more programs have the following functions: sending a communication session request of a first user to a server; receiving an identifier of a second user sent from the server; and establishing a communication session between the first user and the second user according to the identifier of the second user and hiding the identifier of the second user. The second user is a communication session target obtained by the server by matching for first user, and the identifier is used to distinguish the communication session target of the first user.

In addition, the present embodiment further provides a nonvolatile readable storage medium for storing one or more programs, wherein the one or more programs are applied to a terminal device such that the terminal device may execute instructions of the following steps: sending a communication session request of a first user to a server; receiving an identifier of a second user sent from the server; and establishing a communication session between the first user and the second user according to the identifier of the second user and hiding the identifier of the second user. The second user is a communication session target obtained by the server though matching for the first user, and the identifier is used to distinguish the communication session target of the first user.

Through description of the above embodiments, those skilled in the art may clearly understand that the embodiments of the present disclosure may be implemented by hardware or may be implemented in a manner of software working with necessary general-purpose hardware platform. Based on this understanding, the technical solutions of the embodiments of the present disclosure may be presented in a form of software product, the software product may be stored in a nonvolatile storage medium (it may be CD-ROM, U disk, mobile HD etc.) including several instructions to make a computer apparatus (it may be a personal computer, a server, or a network apparatus etc.) carry out the methods of the various embodiments of the present disclosure.

Figure 24:
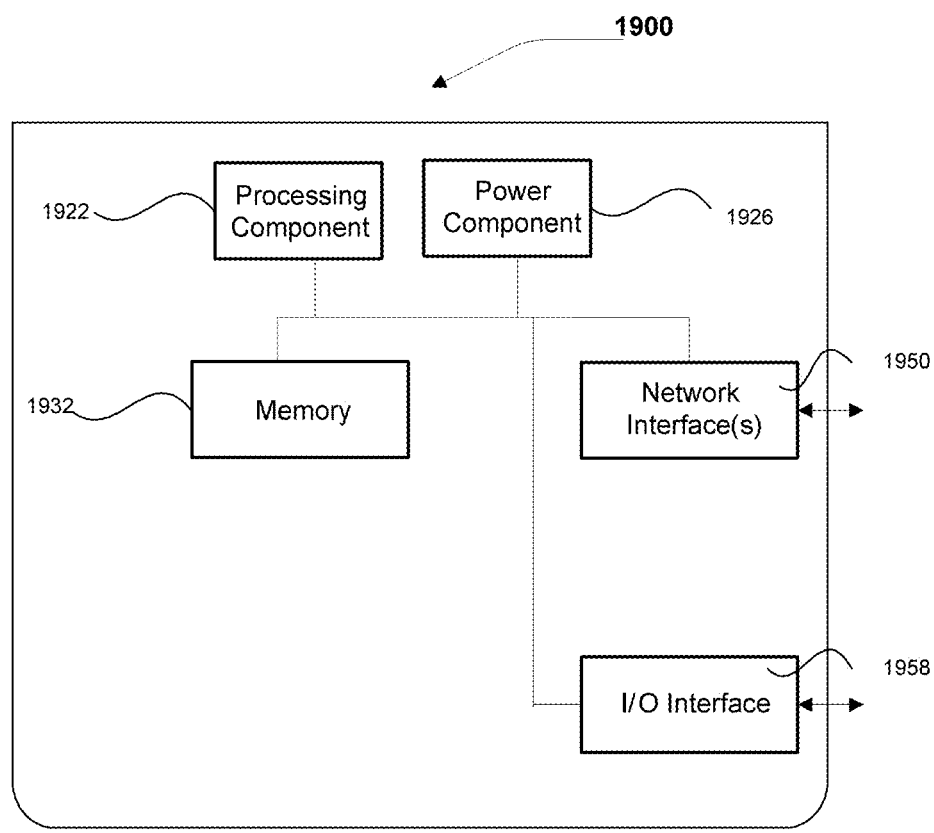
FIG. 24 is a block diagram of a device for establishing a communication session, according to an exemplary embodiment.

FIG. 24 is a block diagram of a device 1900 for establishing a communication session, according to an exemplary embodiment. For example, the device 1900 may be provided as a server. Referring to FIG. 19, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. Further, the processing component 1922 is configured to execute the instructions to perform the above described method for establishing a communication session.

The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux™, FreeBSD™, or the like.

Figure 25:
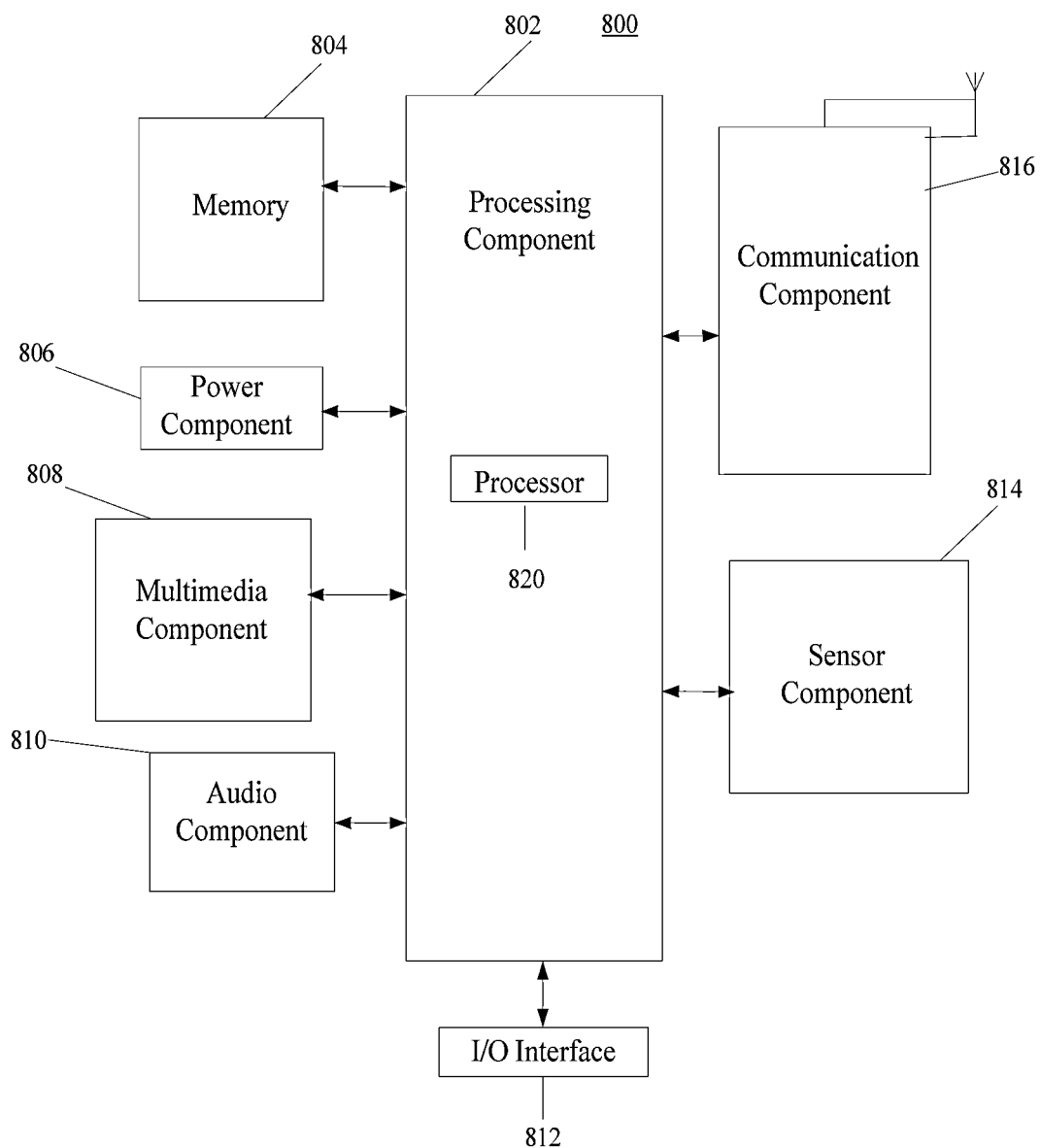
FIG. 25 is a block diagram of a terminal device for establishing a communication session according to an exemplary embodiment.

FIG. 25 is a block diagram of a terminal device 800 for establishing a communication session according to an exemplary embodiment. For example, the terminal device 800 may be a mobile phone, a computer, a digital broadcast terminal device, a messaging device, a gaming console, a tablet, a medical device, exercise equipment, a personal digital assistant, and the like.

Referring to FIG. 25, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device 800 and other devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal device 800, for performing the above-described methods. For example, the non-transitory computer-readable storage medium may be a ROM, a RAM, a CD-ROM, a magnetic tape, a floppy disc, an optical data storage device, and the like.

Those skilled in the art may understand that the drawings are only diagrams of alternative embodiments, and modules or flows in the drawings are not necessary for carrying out the present disclosure.

Those skilled in the art may understand that the modules in the apparatuses of the embodiments may be distributed in the apparatus of the embodiments according to the description of the embodiments, or may be correspondingly changed to be in one or more apparatus different from the present embodiment. The modules of the above embodiments may be combined into one module or may be further divided into a plurality of sub-modules.

The numbers of the above embodiments of the present disclosure are only for description, but not represent the order of the embodiments.

Those skilled in the art may make various change and modifications to the present disclosure without departing the intent and scope of the present disclosure. Thus, if these changes and modifications of the present disclosure fall within the scope of the claims and their equivalents of the present disclosure, the present disclosure intends to contain these changes and the modifications.

What is claimed is:

1. A method for establishing a communication session in a server, comprising:

receiving a communication session request sent from a first user via a terminal device;

recording a receiving time of the communication session request of the first user as a first timing;

obtaining a communication session target for the first user, a second user, by matching for the first user, wherein obtaining the communication session target for the first user comprises:

determining whether a real-time communication session target matching to the first user exists according to the first timing, wherein determining whether the real-time communication session target matching to the first user exists comprises:

determining whether a communication session target matching to the first user is recorded in a locally stored register table;

using the communication session target matching to the first user recorded in the locally stored register table as the real-time communication session target matching to the first user and the process ends, if the communication session target matching to the first user is recorded in the locally stored register table;

selecting the communication session target matching to the first user from a local candidate queue according to a first preset rule, if the communication session target matching to the first user is not recorded in the locally stored register table;

using the communication session target, which is matched to the first user and selected from the local candidate queue according to a first preset rule, as the real-time communication session target matching to the first user, if the selection is successful;

recording the first user and the real-time communication session target matching to the first user in the register table and the process ends, if the selection is successful;

adding the first user to the local candidate queue and the process repeats, if the selection is failed; and determining the real-time communication session target matching to the first user to be not exist, and the process ends if the real-time communication session target matching to the first user is not successfully matched when reaching the first period;

establishing the real-time communication session target matching to the first user as the second user if the real-time communication session target matching to the first user exists; and establishing a user who sends a communication session request at a time closest to and prior to the first timing as the second user if the real-time communication session target matching to the first user does not exist, wherein the real-time communication session target matching to the first user is a user who sends a communication session request within a first period prior to or after the first timing;

sending an identifier of the second user to the terminal device to establish a communication session between the first user and the second user, wherein the identifier is used for the terminal device to distinguish the communication session target of the first user, and is hidden from the first user.

2. The method according to claim 1, wherein after sending the identifier of the second user to the terminal device, the method further comprises:

processing user information of the second user, such that the processed user information of the second user does not reveal personal information of the second user; and sending the processed user information of the second user to the terminal device.

3. The method according to claim 1, wherein the first preset rule is any one or any combination of the following rules:

a rule in which a user, who has different gender from the first user, is selected from the candidate queue with a first preset probability to be used as the real-time communication session target matching to the first user; and a rule in which a user, who is in the same city as the first user, is selected from the candidate queue with a second preset probability to be used as the real-time communication session target matching to the first user.

4. The method according to claim 1, wherein establishing the user who sends the communication session request at the time closest to and prior to the first timing as the second user comprises:

searching for a user who sends the communication session request prior to the first timing in a forwarding order in accordance with a timing at which the communication session request is sent; and establishing the user who meets a second present rule as the second user if the user who meets the second preset rule is found.

5. The method according to claim 4, wherein the second preset rule is any one or any combination of the following rules:

a rule in which a user, who has different gender from the first user, is selected with a third preset probability to be used as the second user; and a rule in which a user, who is in the same city as the first user, is selected with a fourth preset probability to be used as the second user.

6. A method for establishing a communication session in a terminal device, comprising:

sending a communication session request of a first user to a server;

receiving an identifier of a second user sent from the server; and establishing a communication session between the first user and the second user according to the identifier of the second user, wherein the second user is a communication session target obtained by the server, and the identifier is used to distinguish the communication session target of the first user and is hidden from the first user; wherein the server obtains the communication session target by performing a method comprising:

receiving the communication session request of the first user;

recording a receiving time of the communication session request of the first user as a first timing;

determining whether a real-time communication session target matching to the first user exists according to the first timing, wherein determining whether the real-time communication session target matching to the first user exists comprises:

determining whether a communication session target matching to the first user is recorded in a locally stored register table;

using the communication session target matching to the first user recorded in the locally stored register table as the real-time communication session target matching to the first user and the process ends, if the communication session target matching to the first user is recorded in the locally stored register table;

selecting the communication session target matching to the first user from a local candidate queue according to a first preset rule, if the communication session target matching to the first user is not recorded in the locally stored register table;

using the communication session target, which is matched to the first user and selected from the local candidate queue according to a first preset rule, as the real-time communication session target matching to the first user, if the selection is successful;

recording the first user and the real-time communication session target matching to the first user in the register table and the process ends, if the selection is successful;

adding the first user to the local candidate queue and the process repeats, if the selection is failed; and determining the real-time communication session target matching to the first user to be not exist, and the process ends if the real-time communication session target matching to the first user is not successfully matched when reaching the first period;

establishing the real-time communication session target matching to the first user as the second user if the real-time communication session target matching to the first user exists;

establishing a user who sends a communication session request at a time closest to and prior to the first timing as the second user if the real-time communication session target matching to the first user does not exist, wherein the real-time communication session target matching to the first user is a user who sends a communication session request within a first period prior to or after the first timing; and sending the identifier of the second user to the terminal device.

7. The method according to claim 6, wherein after establishing the communication session between the first user and the second user, the method further comprises:
receiving user information of the second user sent from the server; and
outputting the user information of the second user after processing the user information of the second user, such that the output user information does not reveal personal information of the second user.

8. The method according to claim 7, wherein after establishing the communication session between the first user and the second user, the method further comprises:
receiving user information of the first user, and processing the user information of the first user, such that the processed user information of the first user does not reveal personal information of the first user.

9. The method according to claim 7, wherein after establishing the communication session between the first user and the second user, the method further comprises:
forwarding a request sent from the first user for obtaining the user information of the second user to the server if the communication session between the first user and the second user reaches a first preset condition.

10. The method according to claim 9, wherein if the second user agrees to the request of the first user for obtaining the user information of the second user, the method further comprises:
receiving the user information of the second user sent from the server.

11. The method according to claim 9, wherein the first condition is met when a number of conversations reaches a preset number in the communication session between the first user and the second user.

12. The method according to claim 7, wherein after establishing the communication session between the first user and the second user, the method further comprises:
outputting opening remarks of the second user, which comprises words, photos, audio files or video files stored in the server by the second use, sent from the server.

13. A terminal device for establishing a communication session, comprising:
a processor; and
a memory for storing instructions executable by the processor, wherein the processor is configured to perform:
sending a communication session request of a first user to a server;
receiving an identifier of a second user sent from the server; and
establishing a communication session between the first user and the second user according to the identifier of the second user, wherein the second user is a communication session target obtained by the server, and the identifier is used to distinguish the communication session target of the first user and is hidden from the first user; wherein the server obtains the communication session target by performing a method comprising:
receiving the communication session request of the first user;
recording a receiving time of the communication session request of the first user as a first timing;
determining whether a real-time communication session target matching to the first user exists according to the first timing, wherein determining whether the real-time communication session target matching to the first user exists comprises:
determining whether a communication session target matching to the first user is recorded in a locally stored register table;
using the communication session target matching to the first user recorded in the locally stored register table as the real-time communication session target matching to the first user and the process ends, if the communication session target matching to the first user is recorded in the locally stored register table;
selecting the communication session target matching to the first user from a local candidate queue according to a first preset rule, if the communication session target matching to the first user is not recorded in the locally stored register table;
using the communication session target, which is matched to the first user and selected from the local candidate queue according to a first preset rule, as the real-time communication session target matching to the first user, if the selection is successful;
recording the first user and the real-time communication session target matching to the first user in the register table and the process ends, if the selection is successful;
adding the first user to the local candidate queue and the process repeats, if the selection is failed; and
determining the real-time communication session target matching to the first user to be not exist, and the process ends if the real-time communication session target matching to the first user is not successfully matched when reaching the first period;
establishing the real-time communication session target matching to the first user as the second user if the real-time communication session target matching to the first user exists;
establishing a user who sends a communication session request at a time closest to and prior to the first timing as the second user if the real-time communication session target matching to the first user does not exist, wherein the real-time communication session target matching to the first user is a user who sends a communication session request within a first period prior to or after the first timing; and
sending the identifier of the second user to the terminal device.

14. The terminal device according to claim 13, wherein the processor is configured, after establishing the communication session between the first user and the second user, to perform:
receiving user information of the second user sent from the server; and
outputting the user information of the second user after processing the user information of the second user, such that the output user information does not reveal personal information of the second user.

15. The terminal device according to claim 13, wherein the processor is configured, after the establishing the communication session between the first user and the second user, to perform:

receiving user information of the first user, and processing the user information of the first user, such that the processed user information of the first user does not reveal personal information of the first user.

16. The terminal device according to claim 13, wherein the processor is configured, after the establishing the communication session between the first user and the second user, to perform:

forwarding a request sent from the first user for obtaining the use information of the second user to the server if the communication session between the first user and the second user reaches a first preset condition.

17. The terminal device according to claim 16, wherein if the second user agrees the request of the first user for obtaining the user information of the second user, the method further comprises:

receiving the user information of the second user sent from the server.

18. The terminal device according to claim 16, wherein the first condition is met when a number of conversations reaches a preset number in the communication session between the first user and the second user.

19. The terminal device according to claim 13, wherein the processor is configured, after the establishing the communication session between the first user and the second user, to perform:

outputting opening remarks of the second user, which comprises words, photos, audio files or video files stored in the server by the second use, sent from the server.

* * * * *